United States Patent
Barnette

(10) Patent No.: US 9,219,422 B1
(45) Date of Patent: Dec. 22, 2015

(54) OPERATING A DC-DC CONVERTER INCLUDING A COUPLED INDUCTOR FORMED OF A MAGNETIC CORE AND A CONDUCTIVE SHEET

(71) Applicant: LENOVO ENTERPRISE SOLUTIONS (SINGAPORE) PTE. LTD., Singapore (SG)

(72) Inventor: Jamaica L. Barnette, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/465,064

(22) Filed: Aug. 21, 2014

(51) Int. Cl.
 H02M 3/335 (2006.01)
 H02M 1/14 (2006.01)
 H01F 30/16 (2006.01)

(52) U.S. Cl.
 CPC ............ *H02M 3/33569* (2013.01); *H01F 30/16* (2013.01); *H02M 1/143* (2013.01)

(58) Field of Classification Search
 CPC ............ G05F 1/46; G05F 1/56; H02M 3/155; H02M 7/003; H02M 2003/1552
 USPC .......... 336/178, 192, 200, 212, 225, 229, 232
 See application file for complete search history.

(56) References Cited

U.S. PATENT DOCUMENTS 3,239,798 A * 3/1966 Silver .............................. 439/631
3,969,752 A * 7/1976 Martin et al. .................. 257/531
4,139,935 A 2/1979 Bertin et al.
4,193,083 A 3/1980 Max
4,232,254 A 11/1980 Haferl
4,447,866 A 5/1984 Reeves
(Continued)

FOREIGN PATENT DOCUMENTS

GB 2484010 A 3/2012
JP 55-111664 8/1980
(Continued)

OTHER PUBLICATIONS

Schrom et al., "Feasibility of Monolithic and 3D-Stacked DC-DC Converters for Microprocessors in 90nm Technology Generation", In Proceedings of the 2004 international ACM Symposium on Low Power Electronics and Design (ISLPED'04), Aug. 2004, ACM New York, NY, USA.
(Continued)

*Primary Examiner* — Jeffrey Gblende
*Assistant Examiner* — Yusef Ahmed
(74) *Attorney, Agent, or Firm* — Edward J. Lenart; Katherine S. Brown; Kennedy Lenart Spraggins LLP

(57) ABSTRACT

A DC-DC converter includes power-switching phases which each include a high-side and low-side switch. The high-side switch is coupled to the low-side switch at a connection node. The converter also includes a coupled inductor formed of a magnetic core and a conductive sheet. The sheet is formed of a comb structure having a tab and teeth extending from the tab. The conductive sheet is inserted into a slot defined by the magnetic core and extends through the magnetic core with a portion of the tab protruding from the back and a portion of each tooth protruding from the front of the core. Each tooth is coupled to a connection node of a phase and the tab extending through the core forms a toroidal inductor with a single loop coil for each phase, and for all the phases, a directly coupled inductor.

20 Claims, 11 Drawing Sheets

(56) References Cited

U.S. PATENT DOCUMENTS

| | | | |
|---|---|---|---|
| 4,720,667 A | 1/1988 | Lee et al. | |
| 4,720,668 A | 1/1988 | Lee et al. | |
| 4,785,387 A | 11/1988 | Lee et al. | |
| 4,841,220 A | 6/1989 | Tabisz et al. | |
| 4,851,769 A | 7/1989 | Carpenter et al. | |
| 4,857,822 A | 8/1989 | Tabisz et al. | |
| 4,860,184 A | 8/1989 | Tabisz et al. | |
| 4,866,367 A | 9/1989 | Ridley et al. | |
| 4,866,525 A | 9/1989 | Rodriguez-Cavazos et al. | |
| 4,931,716 A | 6/1990 | Jovanovic et al. | |
| 4,961,048 A | 10/1990 | Banura | |
| 5,063,488 A | 11/1991 | Harada et al. | |
| 5,068,776 A | 11/1991 | Polivka | |
| 5,122,728 A | 6/1992 | Ashley | |
| 5,204,809 A | 4/1993 | Andresen | |
| 5,262,930 A | 11/1993 | Hua et al. | |
| 5,325,283 A | 6/1994 | Farrington et al. | |
| 5,329,439 A | 7/1994 | Borojevic et al. | |
| 5,373,432 A | 12/1994 | Vollin et al. | |
| 5,418,702 A | 5/1995 | Marinus et al. | |
| 5,418,704 A | 5/1995 | Hua et al. | |
| 5,432,695 A | 7/1995 | Vlatkovic et al. | |
| 5,442,540 A | 8/1995 | Hua et al. | |
| 5,477,858 A | 12/1995 | Norris et al. | |
| 5,479,087 A | 12/1995 | Wright | |
| 5,486,752 A | 1/1996 | Hua et al. | |
| 5,530,396 A | 6/1996 | Vlatkovic et al. | |
| 5,541,828 A | 7/1996 | Rozman | |
| 5,574,636 A | 11/1996 | Lee et al. | |
| 5,633,793 A | 5/1997 | Lee et al. | |
| 5,694,302 A | 12/1997 | Faulk | |
| 5,793,272 A | 8/1998 | Burghartz et al. | |
| 5,914,572 A | 6/1999 | Qian et al. | |
| 5,920,471 A | 7/1999 | Rajagopalan et al. | |
| 5,949,199 A | 9/1999 | Qian et al. | |
| 6,018,468 A | 1/2000 | Archer et al. | |
| 6,043,634 A | 3/2000 | Nguyen et al. | |
| 6,057,652 A | 5/2000 | Chen et al. | |
| 6,114,937 A | 9/2000 | Burghartz et al. | |
| 6,147,882 A | 11/2000 | Huber et al. | |
| 6,211,579 B1 | 4/2001 | Blair | |
| 6,268,093 B1 | 7/2001 | Kenan et al. | |
| 6,330,170 B1 | 12/2001 | Wang et al. | |
| 6,337,801 B2 | 1/2002 | Li et al. | |
| 6,344,956 B1 * | 2/2002 | Morita | 361/19 |
| 6,349,044 B1 | 2/2002 | Canales-Abarca et al. | |
| 6,362,986 B1 | 3/2002 | Schultz et al. | |
| 6,414,469 B1 | 7/2002 | Zhou et al. | |
| 6,426,666 B1 | 7/2002 | Li et al. | |
| 6,437,999 B1 | 8/2002 | Wittenbreder | |
| 6,442,033 B1 | 8/2002 | Liu et al. | |
| 6,452,815 B1 | 9/2002 | Zhu et al. | |
| 6,466,459 B1 | 10/2002 | Guerrera | |
| 6,480,086 B1 | 11/2002 | Kluge et al. | |
| 6,531,740 B2 | 3/2003 | Bosco et al. | |
| 6,545,450 B1 | 4/2003 | Ledenev et al. | |
| 6,552,565 B2 | 4/2003 | Chang et al. | |
| 6,552,917 B1 | 4/2003 | Bourdillon | |
| 6,587,356 B2 | 7/2003 | Zhu et al. | |
| 6,590,791 B1 | 7/2003 | Zhou et al. | |
| 6,600,640 B1 * | 7/2003 | Buscher et al. | 361/93.1 |
| 6,636,430 B1 | 10/2003 | Batarseh et al. | |
| 6,650,217 B1 | 11/2003 | Wolf et al. | |
| 6,683,797 B2 | 1/2004 | Zaitsu et al. | |
| 6,696,803 B2 | 2/2004 | Tao et al. | |
| 6,696,823 B2 | 2/2004 | Ledenev et al. | |
| 6,710,639 B2 | 3/2004 | Huang et al. | |
| 6,737,842 B2 | 5/2004 | Bai et al. | |
| 6,757,184 B2 | 6/2004 | Wei et al. | |
| 6,781,853 B2 | 8/2004 | Xu et al. | |
| 6,784,644 B2 | 8/2004 | Xu et al. | |
| 6,800,985 B2 | 10/2004 | Baker et al. | |
| 6,815,937 B2 | 11/2004 | Poon et al. | |
| 6,819,574 B2 | 11/2004 | Xu et al. | |
| 6,834,002 B2 | 12/2004 | Yang | |
| 6,859,372 B2 | 2/2005 | Xu et al. | |
| 6,876,556 B2 | 4/2005 | Zhu et al. | |
| 6,933,541 B1 | 8/2005 | Huang | |
| 6,944,033 B1 | 9/2005 | Xu et al. | |
| 6,952,335 B2 | 10/2005 | Huang et al. | |
| 6,989,997 B2 | 1/2006 | Xu et al. | |
| 7,016,203 B2 | 3/2006 | Xu et al. | |
| 7,046,527 B2 | 5/2006 | West | |
| 7,071,660 B2 | 7/2006 | Xu et al. | |
| 7,106,035 B2 | 9/2006 | Xing | |
| 7,109,838 B2 | 9/2006 | Brennan et al. | |
| 7,132,820 B2 | 11/2006 | Walters et al. | |
| 7,161,335 B2 | 1/2007 | Wei et al. | |
| 7,180,389 B2 | 2/2007 | Wang et al. | |
| 7,184,281 B2 | 2/2007 | Ren et al. | |
| 7,196,914 B2 | 3/2007 | Ren et al. | |
| 7,199,695 B1 | 4/2007 | Zhou et al. | |
| 7,233,132 B1 | 6/2007 | Dong et al. | |
| 7,254,047 B2 | 8/2007 | Ren et al. | |
| 7,265,525 B2 | 9/2007 | Xu et al. | |
| 7,304,867 B2 | 12/2007 | Usui | |
| 7,317,305 B1 * | 1/2008 | Stratakos et al. | 323/282 |
| 7,352,269 B2 * | 4/2008 | Li et al. | 336/170 |
| 7,358,710 B2 | 4/2008 | Luo et al. | |
| 7,391,165 B2 | 6/2008 | Lee et al. | |
| 7,447,924 B2 | 11/2008 | May | |
| 7,498,782 B2 * | 3/2009 | Nguyen et al. | 323/282 |
| 7,498,920 B2 * | 3/2009 | Sullivan et al. | 336/200 |
| 7,525,408 B1 | 4/2009 | Li et al. | |
| 7,528,625 B2 | 5/2009 | Ozasa et al. | |
| 7,531,407 B2 | 5/2009 | Clevenger et al. | |
| 7,545,208 B2 | 6/2009 | Rodriguez | |
| 7,548,137 B2 | 6/2009 | Wang et al. | |
| 7,554,423 B2 | 6/2009 | Wang et al. | |
| 7,560,833 B2 | 7/2009 | Strzalkowski et al. | |
| 7,560,912 B2 | 7/2009 | Xu et al. | |
| 7,569,875 B2 | 8/2009 | Suzuki et al. | |
| 7,570,037 B2 | 8/2009 | Li et al. | |
| 7,583,065 B2 | 9/2009 | Xu et al. | |
| 7,602,154 B2 | 10/2009 | Fu et al. | |
| 7,602,159 B2 | 10/2009 | Wang et al. | |
| 7,605,572 B2 | 10/2009 | Xu et al. | |
| 7,613,020 B2 | 11/2009 | Nukisato et al. | |
| 7,638,988 B2 | 12/2009 | Lim et al. | |
| 7,649,434 B2 | 1/2010 | Xu et al. | |
| 7,705,577 B2 | 4/2010 | Li et al. | |
| 7,742,318 B2 * | 6/2010 | Fu et al. | 363/16 |
| 7,746,041 B2 | 6/2010 | Xu et al. | |
| 7,746,209 B1 | 6/2010 | Li et al. | |
| 7,746,675 B2 | 6/2010 | Wang et al. | |
| 7,772,955 B1 | 8/2010 | Li et al. | |
| 7,791,321 B2 * | 9/2010 | Xu et al. | 323/272 |
| 7,800,922 B2 | 9/2010 | Takayanagi et al. | |
| 7,804,281 B2 | 9/2010 | Wang et al. | |
| 7,821,375 B2 | 10/2010 | Dong et al. | |
| 7,859,238 B1 | 12/2010 | Stratakos et al. | |
| 7,864,016 B1 | 1/2011 | Li et al. | |
| 7,872,886 B2 | 1/2011 | Xu et al. | |
| 7,876,191 B2 * | 1/2011 | Chandrasekaran et al. | 336/212 |
| 7,893,669 B2 * | 2/2011 | Osterhout et al. | 323/272 |
| 7,893,806 B1 | 2/2011 | Li et al. | |
| 7,898,379 B1 | 3/2011 | Stratakos et al. | |
| 7,932,800 B2 | 4/2011 | Lim et al. | |
| 7,965,165 B2 | 6/2011 | Ikriannikov et al. | |
| 7,977,763 B2 | 7/2011 | Lin et al. | |
| 7,982,441 B2 | 7/2011 | Crowther et al. | |
| 7,994,888 B2 | 8/2011 | Ikriannikov | |
| 8,030,908 B2 | 10/2011 | Huang | |
| 8,044,645 B2 * | 10/2011 | Zambetti et al. | 323/272 |
| 8,053,890 B2 | 11/2011 | Puma et al. | |
| 8,072,200 B1 | 12/2011 | Qiu et al. | |
| 8,208,878 B1 | 6/2012 | Hardy et al. | |
| 8,238,122 B2 | 8/2012 | Torrico-Bascope et al. | |
| 8,350,658 B1 | 1/2013 | Stratakos et al. | |
| 8,416,043 B2 * | 4/2013 | Ikriannikov | 336/83 |
| 8,576,000 B2 | 11/2013 | Kim et al. | |
| 8,592,966 B2 | 11/2013 | Wood et al. | |
| 8,947,186 B2 * | 2/2015 | Kurs et al. | 336/55 |
| 8,957,514 B1 * | 2/2015 | Barnette | 257/691 |

(56) References Cited

U.S. PATENT DOCUMENTS

| | | | |
|---|---|---|---|
| 2002/0096697 A1 | 7/2002 | Tihanyi | |
| 2005/0225307 A1 | 10/2005 | Sato et al. | |
| 2006/0291260 A1 | 12/2006 | Nakashima | |
| 2007/0195563 A1 | 8/2007 | Shiraishi et al. | |
| 2007/0252659 A1* | 11/2007 | Suenaga et al. | 333/32 |
| 2008/0067990 A1 | 3/2008 | Wei | |
| 2009/0086514 A1* | 4/2009 | Fornage et al. | 363/21.17 |
| 2010/0127683 A1 | 5/2010 | Uno et al. | |
| 2011/0043173 A1 | 2/2011 | Blaumeiser et al. | |
| 2011/0090716 A1 | 4/2011 | Asuke et al. | |
| 2011/0133716 A1* | 6/2011 | Cheung et al. | 323/285 |
| 2011/0248812 A1 | 10/2011 | Hu et al. | |
| 2011/0279100 A1* | 11/2011 | Ikriannikov | 323/271 |
| 2011/0313749 A1 | 12/2011 | Wu | |
| 2012/0002446 A1 | 1/2012 | Madawala et al. | |
| 2013/0099887 A1* | 4/2013 | Yamamoto | 336/220 |
| 2013/0141199 A1 | 6/2013 | Hayes et al. | |
| 2013/0141878 A1* | 6/2013 | Wu et al. | 361/748 |
| 2013/0154590 A1 | 6/2013 | Ragona et al. | |
| 2013/0154595 A1 | 6/2013 | Drinovsky | |
| 2013/0221885 A1 | 8/2013 | Hunter | |
| 2013/0229830 A1* | 9/2013 | Barnette et al. | 363/21.04 |
| 2013/0229831 A1* | 9/2013 | Barnette et al. | 363/21.04 |
| 2014/0132234 A1 | 5/2014 | Barnette et al. | |
| 2014/0132237 A1* | 5/2014 | Barnette et al. | 323/286 |
| 2014/0145688 A1* | 5/2014 | Ikriannikov | 323/234 |
| 2015/0097615 A1 | 4/2015 | Barnette | |

FOREIGN PATENT DOCUMENTS

| | | |
|---|---|---|
| JP | 05-022935 | 1/1993 |
| JP | 02012-060854 A | 3/2012 |
| TW | 271917 B1 | 1/2007 |
| WO | WO 2010/002906 A2 | 1/2010 |

OTHER PUBLICATIONS

Sturcken et al., "Design of Coupled Power Inductors with Crossed Anisotropy Magnetic Core for Integrated Power Conversion", Twenty-Seventh Annual IEEE Applied Power Electronics Conference and Exposition (APEC), Feb. 2012, pp. 417-423, IEEE Xplore Digital Library (online publication), DOI: 10.1109/APEC.2012. 6165853.

Wong, "Performance Improvements of Multi-Channel Interleaving Voltage Regulator Modules with Integrated Coupling Inductors", PhD Thesis, Mar. 28, 2001, 224 pages, Virginia Polytechnic Institute and State University, Blacksburg, Virginia.

Pandya et al., "A Simplified Method of Generating Thermal Models for Power MOSFETs", Eighteenth Annual IEEE Symposium on Semiconductor Thermal Measurement and Management, Mar. 2002, pp. 83-87, IEEE Xplore Digital Library (online publication), DOI: 10.1109/STHERM.2002.991350.

Wong et al., "A Novel Modeling Concept for Multi-coupling Core Structures", Sixteenth Annual IEEE Applied Power Electronics Conference and Exposition (APEC), Mar. 2001, pp. 102-108, vol. 1, IEEE Xplore Digital Library (online publication), DOI: 10.1109/ APEC.2001.911634.

Ille et al., "Reliability Aspects of Gate Oxide under ESD Pulse Stress", 29th Electrical Overstress/Electrostatic Discharge Symposium (EOS/ESD), Sep. 2007, pp. 6A.1-1-6A.1-10, IEEE Xplore Digital Library (online publication), DOI: 10.1109/EOSESD.2007. 4401771.

Pulse, "SMT Power Inductors Power Beads—PA0766NL Series", Data Sheet, Jul. 2009, 3 pages, pulseeng.com (online publication), URL: http://media.digikey.com/pdf/Data%20Sheets/ Pulse%20PDFs/PA0766NL_Series.pdf.

Padiyar, U.H., et al., "A System Level Solution to Improve VRM Efficiency", IEEE International Conference on Industrial Technology, Feb. 10-13, 2009, pp. 1-5, IEEE, USA, Digital Object Identifier: 10.1109/ICIT.2009.4939661.

Sullivan, C. R., "Computationally Efficient Winding Loss Calculation with Multiple Windings, Arbitrary Waveforms and Two- or Three-Dimensional Field Geometry", IEEE Transactions on Power Electronics, Jan. 2001, pp. 142-150, vol. 16, No. 1, IEEE, USA, Digital Object Identifier: 10.1109/63.903999.

Kelly, S. et al., "Core Materials for High Frequency VRM Inductors", Power Electronics Specialists Conference, Jun. 17-21, 2007, pp. 1767-1772, IEEE, USA, Digital Object Identifier: 10.1109/PESC. 2007.4342267.

Prabhakaran, S., et al., "Fabrication of Thin-Film V-Groove Inductors Using Composite Magnetic Materials", International Workshop on Integrated Power Packaging, Jul. 2000, pp. 102-105, Digital Object Identifier: 10.1109/IWIPP.2000.885191, IEEE, USA.

Ghahary, A., "Fully Integrated DC-DC Converters", Power Electronics Technology, Aug. 2004, pp. 24-27, Penton Business Media Inc., Overland Park, KS, USA.

Park, J., et al., "Fully Integrated Micromachined Inductors With Electroplated Anisotropic Magnetic Cores", Thirteenth Annual Applied Power Electronics Conference and Exposition, Feb. 15-19, 1998, pp. 379-385 vol. 1, Digital Object Identifier: 10.1109/APEC. 1998.647718, IEEE, USA.

Yao, K., et al., "Design Considerations for VRM Transient Response Based on the Output Impedance", IEEE Transactions on Power Electronics, Nov. 2003, pp. 1270-1277, vol. 18, No. 6, Digital Object Identifier: 10.1109/TPEL.2003.818824, IEEE, USA.

Parker, S., "Characterizing Properties of Magnetic Films Deposited on Silicon Wafers", May 2009, pp. 39-42, Tuscaloosa, AL, USA.

"Physics Lecture 17—Magnetic Fields cont'd.", upenn.edu (online), accessed Sep. 7, 2011, 5 pages, URL: http://www.physics.upenn. edu/courses/gladney/phys151/lectures/lecture_mar_07_2003. shtml#tth_sEc8.3.

Wang, N., et al.,"Micro-fabricated inductors on silicon for DC-DC converters operating at tens MHz", powersoc.org (online), accessed Feb. 10, 2012, 1 page, URL: http://www.powersoc.org/PwrSOC08/ Presentations/Received/Poster%20P12%20-
%20Ningning%20Wang%20et%20al.%20-%20Micro-
fabricated%20inductors%20on%20silicon%20for%20DC-
DC%20converters%20operating%20at%20tens%20of%20MHz. pdf.

O'Donnell, T., et al., "Microfabricated Inductors for 20 MHz Dc-Dc Converters", Twenty-Third Annual IEEE Applied Power Electronics Conference and Exposition, Feb. 24-28, 2008, pp. 689-693, Digital Object Identifier: 10.1109/APEC.2008.4522796, IEEE, USA.

Phillips, M.D, et al., "A Novel Toroidal Inductor Structure With Through-Hole Vias in Ground Plane", IEEE Transactions on Microwave Theory and Techniques, Jun. 2006, pp. 1325-1330, vol. 54, No. 4, Digital Object Identifier: 10.1109/TMTT.2006.871352, IEEE, USA.

Raieszadeh, M.,"High-Q Integrated Inductors on Trenched Silicon Islands", Thesis, Apr. 12, 2005, pp. 1-92, Georgia Institute of Technology, USA.

Kelly, S., et al., "Core Materials for High Frequency VRM Inductors", IEEE Power Electronics Specialists Conference, Jun. 17-21, 2007, pp. 1767-1772, Digital Object Identifier: 10.1109/PESC.2007. 4342267, IEEE, Orlando, FL, USA.

Rincon-Mora, G.A., et al., "How to fully integrate switching DC-DC supplies with inductor multipliers", EE Times Design, Dec. 18, 2005, pp. 1-3, UBM Electronics, San Francisco, CA, USA.

"Toroidal Magnetic Field," hyperphysics.phy-astr.gsu.edu (online), accessed Sep. 7, 2011, 3 pages, URL: http://hyperphysics.phy-astr. gsu.edu/hbase/magnetic/toroid.html.

Steiner, et al., "A Tuning Transformer for the Automatic Adjustment of Resonant Loop Antennas in RFID Systems", 2004 IEEE International Conference on Industrial Technology (IEEE ICIT '04), Dec. 2004, pp. 912-916, IEEE, Digital Object Identifier: 10.1109/ICIT. 2004.1490196.

Wegleiter, et al., "Automatic Antenna Tuning Unit to Improve RFID System Performance", IEEE Transactions on Instrumentation and Measurement, May 2011, pp. 2797-2803 (section III), vol. 60, Issue 8, IEEE, Digital Object Identifier: 10.1109/TIM.2011.2122390.

Taheri, M., et al., "Analysis and Design of a New Soft Switching Interleaved Converter Using an Integrated Transformer", 2011 $2^{nd}$ Power Electronics, Drive Systems and Technologies Conference

(56) References Cited

OTHER PUBLICATIONS (PEDSTC), Feb. 16-17, 2011, pp. 98-103, IEEE, New York, Digital Object Identifier: 10.1109/PEDSTC.2011.5742505.

Xuechao, L., et al., "A Non-isolated Voltage Regulator Module With Integrating Coupled-Inductor", from IEEE 36$^{th}$ Power Electronics Specialists Conference 2005 (PESC '05), Jun. 16, 2005, pp. 438-442, IEEE, New York, Digital Object Identifier: 10.1109/PESC.2005.1581661.

Cho, et al., "A Novel Transformer Winding for Phase Shift Full Bridge Converter", 31st International Telecommunications Energy Conference 2009 (INTELEC 2009), Oct. 18-22, 2009, pp. 1-5, IEEE, New York, Digital Object Identifier: 10.1109/INTLEC.2009.5351785.

Do, H.L., "Interleaved Boost Converter With a Single Magnetic Component", IET Power Electronics, Aug. 2011, pp. 842-849, vol. 4, Issue. 7, IEEE, United Kingdom, Digital Object Identifier: 10.1049/iet-pel.2010.0256.

Qian, T., et al., "Coupled Input-Series and Output-Parallel Dual Interleaved Flyback Converter for High Input Voltage Application", IEEE Transactions on Power Electronics, Jan. 2008, pp. 88-95, vol. 23, Issue. 1, IEEE, New York, Digital Object Identifier: 10.1109/TPEL.2007.911867.

University of Colorado, Boulder, "The Flyback Converter", Lecture Notes ECEN 4517: Power Electronics and Photovoltaic Power Systems Laboratory, Department of Electrical and Computer Engineering, Spring 2011, pp. 1-11, University of Colorado, Boulder, CO.

Dixon, "Inductor and Flyback Transformer Design", 2001 Magnetics Design Handbook—MAG100A, Mar. 15, 2001, pp. 5-1 to 5-19, Section 5, Texas Instruments Incorporated, Dallas, Texas, USA.

Dixon Jr, L., "The Effects of Leakage Inductance on Switching Power Supply Performance", 2001 Magnetics Design Handbook—MAG100A, Mar. 15, 2001, pp. R4 to R7, Texas Instruments Incorporated, Dallas, TX, USA.

Zhou et al.; "Exploration of On-Chip Switched-Capacitor DC-DC Converter for Multicore Processors Using a Distributed Power Delivery Network", Custom Integrated Circuits Conference (CICC), Sep. 2011, pp. 1-4, IEEE.org (online), doi: 10.1109/CICC.2011.6055333, URL: http://ieeexplore.ieee.org/stamp/stamp.jsp?tp=&arnumber=6055333&isnumber=6055276.

Kudva et al.; "Fully-Integrated On-Chip DC-DC Converter With a 450X Output Range", 2010 IEEE Custom Integrated Circuits Conference (CICC), Sep. 2010, pp. 1-4, IEEE.org (online), doi: 10.1109/CICC.2010.5617588, URL: http://ieeexplore.ieee.org/stamp/stamp.jsp?tp=&arnumber=5617588&isnumber=5617377.

Garner et al., "The Integration of High-Side and Low-Side LIGBTS on Partial Silicon-On-Insulator", Solid-State Electronics, vol. 44, Issue 6, Jun. 2000, pp. 929-935, sciencedirect.com (online), doi: 10.1016/S0038-1101(00)00018-6, URL: http://dx.doi.org/10.1016/S0038-1101(00)00018-6.

Goldman, M., et al., "Analysis and Prediction of Regulation in a Multiple-Output Current-Mode Controlled DC-to-DC Converter", IEEE Transactions on Aerospace and Electronic Systems, vol. 31, Issue: 2, Apr. 1995, pp. 626-633, Institute of Electrical and Electronics Engineers (IEEE), USA, Digital Object Identifier: 10.1109/7.381911.

Oraw et al., "Lossless DCR Current Sensing for Multi-Winding Coupled Inductors", IEEE 30th International Telecommunications Energy Conference (INTELEC 2008), Sep. 2008, 6 pages, IEEE Xplore Digital Library (online) (ieeexplore.ieee.org), DOI: 10.1109/INTLEC.2008.4664023.

Xiao et al., "Parasitic resistance current sensing topology for coupled inductors", International Journal of Electronics, vol. 96, No. 1, Jan. 2009, pp. 51-61, Taylor & Francis (online) (informaworld.com), DOI: 10.1080/00207210802492336.

Ikriannikov et al., "Investigation of DCR Current Sensing in Multiphase Voltage Regulators", Volterra Semiconductor: IBM Power and Cooling Technology Symposium, Oct. 2007, 17 pages, IBM Corporation, USA.

Xu et al., "Novel Coupled-Inductor Multi-phase VRs", Twenty Second Annual IEEE Applied Power Electronics Conference (APEC 2007), Feb. 25-Mar. 1, 2007, pp. 113-119, IEEE Xplore Digital Library (online) (ieeexplore.ieee.org), DOI: 10.1109/APEX.2007.357503.

Dong et al., "DCR Current Sensing Method for Achieving Adaptive Voltage Positioning(AVP) in Voltage Regulators with Coupled Inductors", 37th IEEE Power Electronics Specialists Conference (PESC '06), Jun. 2006, 7 pages, IEEE Xplore Digital Library (online) (ieeexplore.ieee.org), DOI: 10.1109/PESC.2006.1712003.

U.S. Appl. No. 14/465,064, Aug. 21, 2014, pp. 1-39.

* cited by examiner

*Prior Art*

Prior Art DC-DC Converter
100

Prior Art DC-DC Converter
Timing Diagram 130

Identity Switching DC-DC
Converter Timing Diagram
230

Identity Switching DC-DC
Converter 300

Alternatively Activate Each Switch, Where No Two Switches Are Activated At The Same Time 1102

Activate The High-side Switch Of A First Power-switching Phase, Including Coupling The Voltage Source To The Phase's Single Loop Coil, Energizing The Magnetic Material Around The Single Loop Coil, And Providing, Via The Single Loop Coil, Output Current To The Filter And Load 1104

Activate The Low-side Switch Of The First Power-switching Phase, Including Coupling The Phase's Single Loop Coil To The Ground Voltage And Providing, Via A Second Power-switching Phase's Single Loop Coil And The Energized Magnetic Material, Output Current To The Filter And Load 1106

Activate The High-side Switch Of The Second Power-switching Phase, Including Coupling The Voltage Source To The Second Power-switching Phase's Single Loop Coil, Re-energizing The Magnetic Material Around The First Power-switching Phase's Single Coil Element, And Providing, Via The Second Power-switching Phase's Single Coil Element, Output Current To The Filter And Load 1108

Activate The Low-side Switch Of The Second Power-switching Phase, Including Coupling The Second Power-switching Phases's Single Loop Coil To The Ground Voltage And Providing, Via The First Power-switching Phase's Single Loop Coil And The Energized Magnetic Material, Output Current To The Filter And Load 1110

FIG. 11

OPERATING A DC-DC CONVERTER INCLUDING A COUPLED INDUCTOR FORMED OF A MAGNETIC CORE AND A CONDUCTIVE SHEET

BACKGROUND OF THE INVENTION

1. Field of the Invention

The field of the invention is power conversion, or, more specifically, methods operating a DC-DC converter and coupled inductors for use in a DC-DC converter.

2. Description of Related Art

Computer system technology is continually advancing. Data centers, for example, now include hundreds or thousands of servers. Given the number of servers in a data center, decreasing the physical size or 'footprint' of the servers is a top priority for server system and server component designers. One area of focus, for example, is in reducing the size of Direct Current ('DC')-DC converters that distribute DC power amongst components of servers and the like.

In current art, reducing the size of such DC-DC converters is limited, at least in part, by the need for a plurality of output inductors and a filter capacitor. Some DC-DC converters of the prior art have implemented designs to somewhat reduce the physical footprint of the inductors and the capacitor by utilizing a single magnetic core for multiple inductors—an implementation of an indirectly coupled inductor. FIG. 1, for example, sets forth a prior art DC-DC converter that includes an indirectly coupled inductor.

The example DC-DC converter (100) of FIG. 1 includes two power-switching phases (132, 134). Each phase includes two switches: a high-side switch (102, 106), and a low-side switch (104, 108). Each high-side switch (102, 106) includes a control input (110, 114) to activate the switch. Upon activation, each high-side switch (102, 106) couples a voltage source ($V_{IN}$) to an indirectly coupled inductor (118). Each low-side switch (104, 108) also includes a control input (112, 116) to activate the switch. Upon activation, each low-side switch (104, 108) couples one coil of indirectly coupled inductor (118) to a ground voltage.

Coupled inductors come in two forms: indirectly coupled and directly coupled. The dots depicted in the example of FIG. 1 indicate the coupled inductor (118) is an indirectly coupled inductor. The dot convention specifies the flow of current in a coupled inductor as: when current flows 'into' one dot, current is induced in the alternate coil of the coupled inductor and flows 'out of' the other dot. Thus, in an indirectly coupled inductor, current generally flows in the same direction in both coils of the coupled inductor.

The example prior art DC-DC converter (100) of FIG. 1 also includes an output capacitor (120) that operates as a filter and a load, represented by a resistor (122).

FIG. 2 sets forth an example timing diagram (130) of activating the switches (102, 112, 106, 116) of the prior art DC-DC converter (100) of FIG. 1. In the example timing diagram of FIG. 2, switch (102) is activated between time $T_0$ and $T_1$, then deactivated from $T_1$ through $T_3$. Switch (112) is not activated from time $T_0$ and $T_1$, but is activated at time $T_1$ through $T_3$. Switch (114) is only activated between time $T_2$ to $T_3$. Switch (116) is activated from time $T_0$ to $T_2$ and activated again at time $T_3$.

The timing diagram (130) in the example of FIG. 2 specifies that activation of the high-side switch and low-side switch in a single phase of the prior art DC-DC converter (100) of FIG. 1 is asynchronous. Further, during any one given time period, two of the switches are activated at the same time. Although the indirectly coupled inductor in the example prior art DC-DC converter (100) of FIG. 1 represents a reduction in size relative to two, discrete inductors, operating the indirectly coupled prior art DC-DC converter (100) in accordance with the timing diagram of FIG. 2 limits any further inductor and capacitance reduction due to many factors, including for example: efficiency, current ripple, and so on.

SUMMARY OF THE INVENTION

Coupled inductors, DC-DC converters, and methods of operating such DC-DC converter are described in this specification. The DC-DC converter includes a plurality a power-switching phases. Each phase includes a high-side switch and a low-side switch, where the high-side switch is electrically coupled to the low-side switch at a connection node of the power-switching phase. The high-side switch of each power-switching phase is configured, when activated, to couple a voltage source to the phase's single loop coil and the low-side switch of each phase is configured, when activated, to couple the phase's single loop coil to a ground voltage. The DC-DC converter also includes a coupled inductor. The coupled inductor includes a magnetic core having a front, back, and bottom side, the bottom side including an air gap. The magnetic core is formed to define a slot extending through the magnetic core from the front to the back side. The coupled inductor also includes a conductive sheet formed of a comb structure having a tab and a plurality of parallel teeth extending from the tab. The conductive sheet is inserted into the slot of the magnetic core such that the conductive sheet extends through the magnetic core from the back to the front side. A portion of the tab protrudes from the back side and a portion of each of the plurality of teeth protrudes from the front side of the magnetic core. Each of the teeth is configured to be coupled to a connection node of a power-switching phase. The tab extending through the magnetic core forms, for each power-switching phase, a toroidal inductor with a single loop coil, and forms, for the plurality of power-switching phases, a directly coupled inductor. The tab is also electrically coupled to a filter and a load and each switch is alternatively activated and no two switches of any phase are activated at the same time.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 11 sets forth a flow chart illustrating an exemplary method for operating a DC-DC converter according to embodiments of the present invention.

DETAILED DESCRIPTION OF EXEMPLARY EMBODIMENTS

Figure 3:
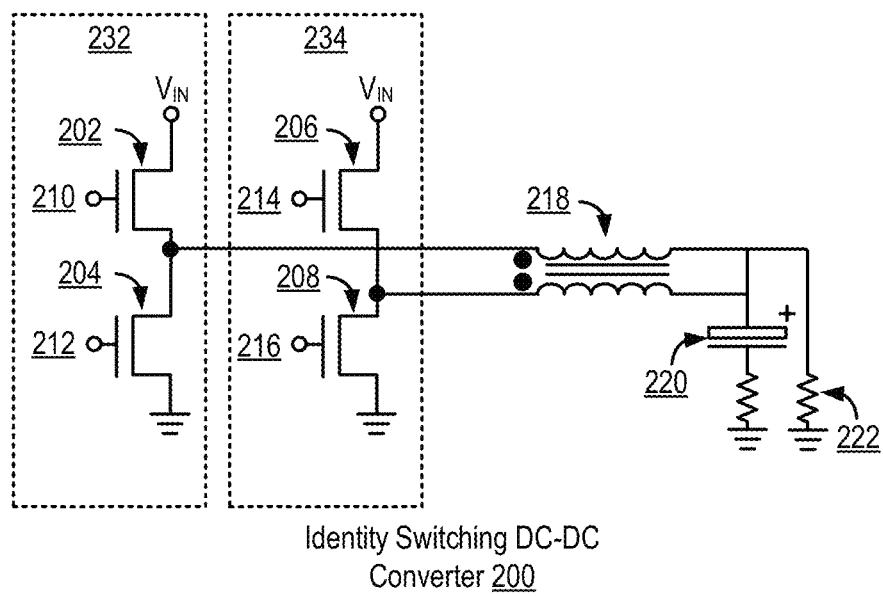
FIG. 3 sets forth sets forth an identity switching DC-DC converter that includes a directly coupled inductor, operated in accordance with embodiments of the present invention.

Exemplary methods and apparatus for operating a DC-DC converter in accordance with embodiments of the present invention are described with reference to the accompanying drawings, beginning with FIG. 3. FIG. 3 sets forth sets forth an identity switching DC-DC converter that includes a directly coupled inductor, operated in accordance with embodiments of the present invention.

Figure 1:
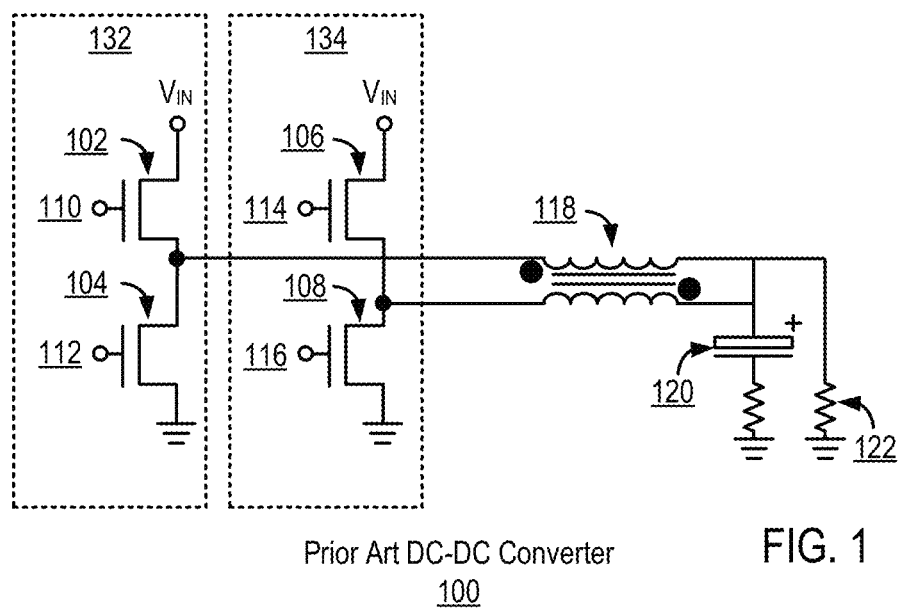
FIG. 1 sets forth a prior art DC-DC converter that includes an indirectly coupled inductor.
Figure 2:
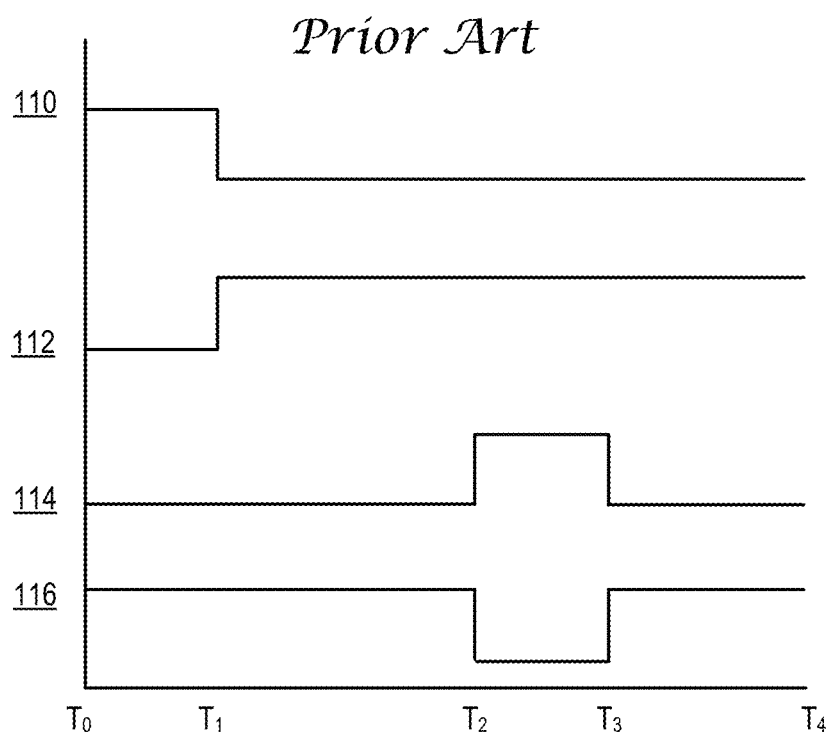
FIG. 2 sets forth an example timing diagram of activating the switches of the prior art DC-DC converter of FIG. 1.

The example identity switching DC-DC converter (200) of FIG. 3 includes a directly coupled inductor (218) that includes a first coil element and a second coil element. The first coil element and second coil element are coupled to an output filter—the capacitor (220)—and a load represented by a resistor (222). Unlike the prior art indirectly coupled inductor (118) of FIG. 1, in the directly coupled inductor (218) in the example of FIG. 3, current generally flows in the opposite direction in the coils of the coupled inductor. That is, when current enters one dot, current is induced to exit the other dot.

The example identity switching DC-DC converter (200) of FIG. 3 also includes two power-switching phases (232, 234). A first power-switching phase (232) includes a high-side switch (202) and a low-side switch (204). The high-side switch (202) is configured, when activated by a control input (210), to couple a voltage source ($V_{IN}$) to the first coil element of the directly coupled inductor (218). The low-side switch (204) is configured, when activated by a control input (212), to couple the first coil element to a ground voltage.

The second power-switching phase (234) of the example identity switching DC-DC converter (200) of FIG. 3 includes a high-side switch (206) and a low-side switch (208). The high-side switch (206) of the second power-switching phase (234) is configured, when activated by a control input (214), to couple the voltage source ($V_{IN}$) to the second coil element of the directly coupled inductor (218). The low-side switch (208) of the second power-switching phase (234) is configured, when activated by a control input (216), to couple the second coil element to the ground voltage.

As will occur to readers of skill in the art, each of the switches (202, 204, 206, 208) in the example of FIG. 3 may be implemented as a Field Effect Transistor ('FET') or the like.

The identity switching DC-DC converter (200) of FIG. 3 is operated by alternatively activating each switch, where no two switches are activated at the same time. For further explanation, FIG. 4 sets forth an example timing diagram of activating switches of the identity switching DC-DC converter of FIG. 3.

The DC-DC converter of FIG. 3 is described as an 'identity switching' converter due to the pattern of activating switches when viewed in a matrix or table. The example table below describes the timing of the switch activations as seen in the example timing diagram of FIG. 4:

TABLE 1

Switch Activation Pattern For Identity Switching DC-DC Converter (200) of FIG. 3

| Control Input, Switch | $T_0$-$T_1$ | $T_1$-$T_2$ | $T_2$-$T_3$ | $T_3$-$T_4$ |
|---|---|---|---|---|
| CI (210), HS Switch (202) | 1 | 0 | 0 | 0 |
| CI (212), LS Switch (204) | 0 | 1 | 0 | 0 |
| CI (214), HS Switch (206) | 0 | 0 | 1 | 0 |
| CI (216), LS Switch (208) | 0 | 0 | 0 | 1 |

In the example Table 1 above, it can be seen that the control input and associated switches are alternatively activated (represented by a '1' in the table) in a manner that forms an identity of the table. Further, no two switches are activated at the same time. As depicted in Table 1 and the example timing diagram (230) of FIG. 4: from time $T_0$-$T_1$, only the high-side switch (202) of the first power-switching phase (232) is activated; from time $T_1$-$T_2$, only the low-side switch (204) of the first power-switching phase (232) is activated; from time $T_2$-$T_3$, only the high-side switch (206) of the second power-switching phase (234) is activated; and from time $T_3$-$T_4$, only the low-side switch (208) of the second power-switching phase (234) is activated.

In this way, each phase is utilized at a 180 degree offset and each high-side switch for a period of time according to:

$$\frac{D}{N},$$

where D represents a duty cycle and N represents the number of power-switching phases. Each low-side switch is therefore activated for a period of time according to:

$$\frac{(1-D)}{N}.$$

In this way, the number of phases is inversely proportional to the duty cycle of activating the switches—that is, the 'effective' duty cycle—and thereby is inversely proportional to the inductance of the directly coupled inductor. Increasing the number of phases, therefore, decreases the inductance.

Figure 4:
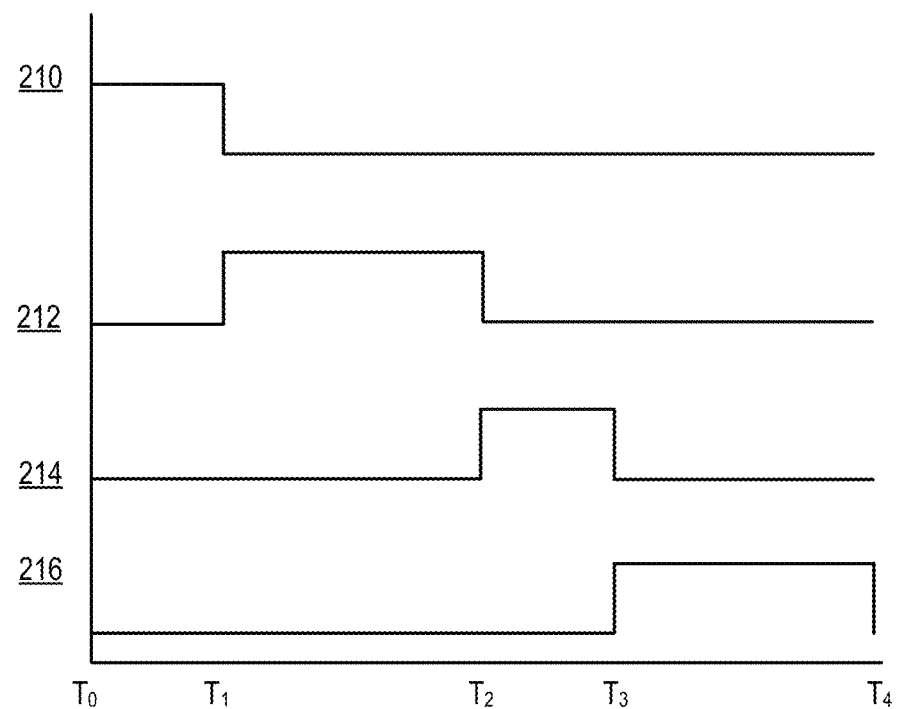
FIG. 4 sets forth an example timing diagram of activating switches of the identity switching DC-DC converter of FIG. 3.

And the transfer function of the identity switching DC-DC converter (200) of FIG. 3, when operated in accordance with the identity switching scheme in Table 1 and the timing diagram (230) of FIG. 4 is:

$$\frac{V_{OUT}}{V_{IN}} = \frac{D}{N}$$

Operating the example identity switching DC-DC converter (200) of FIG. 3 in accordance with the identity switching scheme in Table 1 and the timing diagram of FIG. 4 enables energy to be stored between deactivating the low-side switch (212) of the first power-switching phase (232) and activation of the high-side switch of the second power-switching phase (234), thus increasing overall system efficiency and reducing current ripple. That is, current ripple experienced by the magnetic core of the directly coupled inductor (218) and the output capacitor (220) is reduced, relative to circuits of the prior art, due in part to the effective reduced duty cycle of the switch activations. The current ripple experienced by the output filter capacitor (220) and the load (222) may be calculated as:

$$\frac{1}{f*L_{OL}}*\left(1-\frac{V_{OUT}}{V_{IN}}\right)*\frac{V_{OUT}}{N},$$

where f represents the frequency of alternatively activating each switch, $L_{OL}$ represents the open loop inductance of the directly coupled inductor, N represents the number of power-switching phases, $V_{IN}$ represents the voltage of the voltage source and $V_{OUT}$ represents the voltage experienced at the filter and load.

Figure 5:
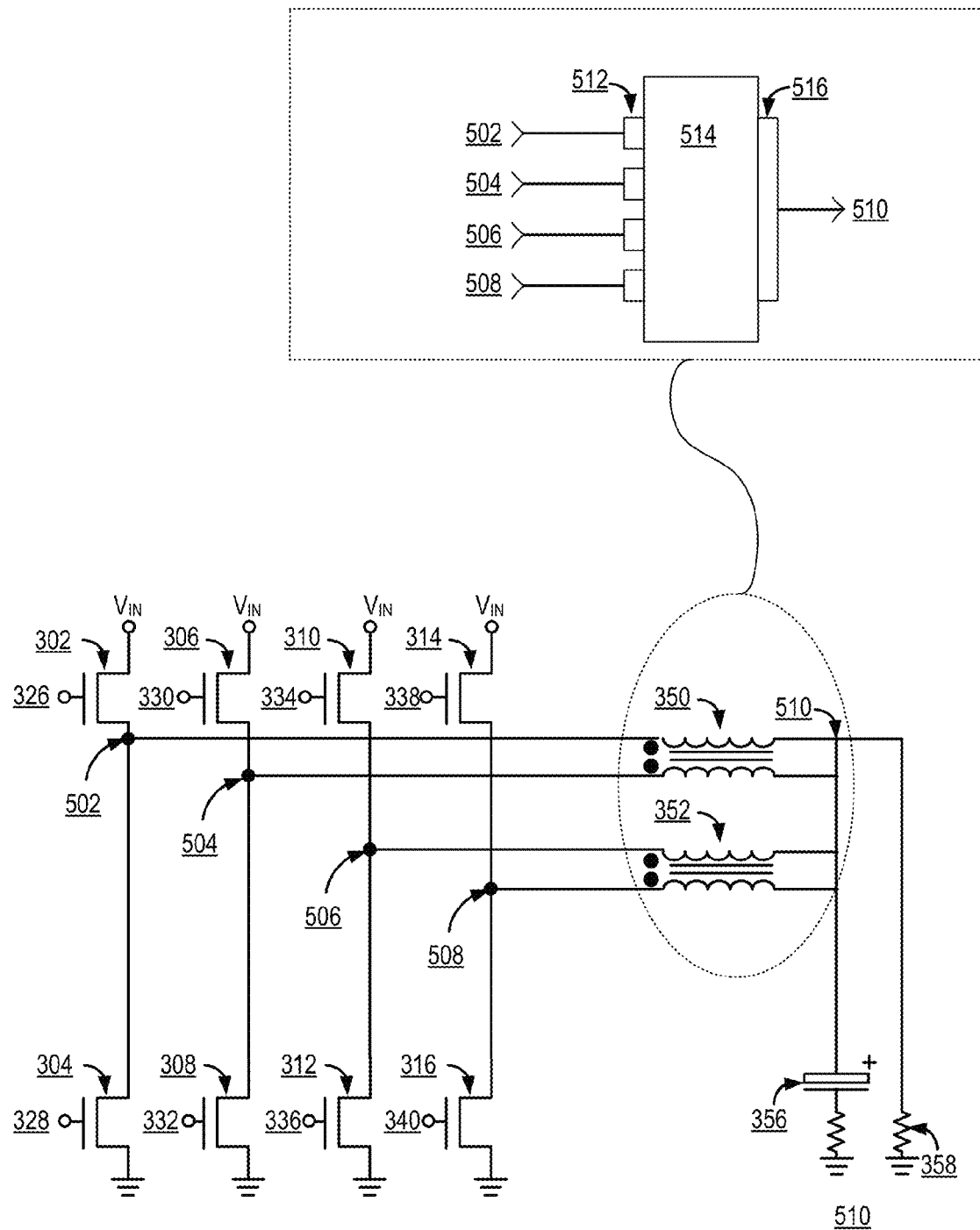
FIG. 5 depicts an identity switching DC-DC converter operated in accordance with embodiments of the present invention that includes a plurality of power-switching phases.

FIGS. 3 and 4 generally depict an identity switching DC-DC converter configured with two phases and operation thereof, but readers of skill in the art will recognize that an identity switching DC-DC converter operated in accordance with embodiments of the present invention may have any number of phases. For further explanation, therefore, FIG. 5 depicts an identity switching DC-DC converter (300) operated in accordance with embodiments of the present invention that includes a plurality of power-switching phases. The example DC-DC converter (300) of FIG. 5 includes four power-switching phases:

- a first power-switching phase that includes a high-side switch (302) and a low-side switch (304);
- a second power-switching phase that includes a high-side switch (306) and a low-side switch (308);
- a third power-switching phase that includes a high-side switch (310) and a low-side switch (312); and
- a fourth power-switching phase that includes a high-side switch (314) and a low-side switch (316).

Each high-side switch (302, 306, 310, 314) includes a control input (326, 330, 334, 338) for activating the switch. Each low-side switch (304, 308, 312, 316) includes a control input (328, 332, 336, 340) for activating the switch. Each pair of phases is connected to a directly coupled inductor (350, 352), an output filter capacitor (356), and a load (358).

The switches in the example identity switching DC-DC converter (300) of FIG. 5 are alternatively activated and no two switches are activated concurrently. The following table sets forth the timing of switch activations in the example DC_DC converter (300) of FIG. 5:

TABLE 2

Switch Activation Pattern For Identity Switching DC-DC Converter (300) of FIG. 5

| Control Input, Switch | 0 Deg. | 0 Deg. | 180 Deg | 180 Deg. | 90 Deg. | 90 Deg. | 270 Deg. | 270 Deg. |
|---|---|---|---|---|---|---|---|---|
| CI (326), HS Switch (302) | 1 | 0 | 0 | 0 | 0 | 0 | 0 | 0 |
| CI (328), LS Switch (304) | 0 | 1 | 0 | 0 | 0 | 0 | 0 | 0 |
| CI (330), HS Switch (306) | 0 | 0 | 1 | 0 | 0 | 0 | 0 | 0 |
| CI (332), LS Switch (308) | 0 | 0 | 0 | 1 | 0 | 0 | 0 | 0 |
| CI (334), HS Switch (310) | 0 | 0 | 0 | 0 | 1 | 0 | 0 | 0 |
| CI (336), LS Switch (312) | 0 | 0 | 0 | 0 | 0 | 1 | 0 | 0 |
| CI (338), HS Switch (314) | 0 | 0 | 0 | 0 | 0 | 0 | 1 | 0 |
| CI (340), LS Switch (316) | 0 | 0 | 0 | 0 | 0 | 0 | 0 | 1 |

In the example Table 2 above, no two switches are activated concurrently. The second power-switching phase operates an offset of 180 degrees from the first power-switching phase. The fourth power-switching phase operates at an offset of 180 degrees from the third power-switching phase.

Also in the example of FIG. 5, the mutually coupled inductors are implemented as a single magnetic core (514) having a front, back, and bottom side (not shown). The bottom side includes an air gap. The magnetic core is formed to define a slot extending through the magnetic core (514) from the front to the back side. The mutually coupled inductor also includes a conductive sheet. The conductive sheet is formed in a comb structure having a tab (516) and a plurality of parallel teeth (512) extending from the tab. The conductive sheet in the example of FIG. 5 has been inserted into the slot of the magnetic core (514) such that the conductive sheet extends through the magnetic core from the back to the front side, a portion of the tab protrudes from the back side, and a portion of each of teeth protrudes from the front side. In the example of FIG. 5, each of the teeth (512) is coupled to a connection node (502, 504, 506, 508) of a power-switching phase.

Figure 6:
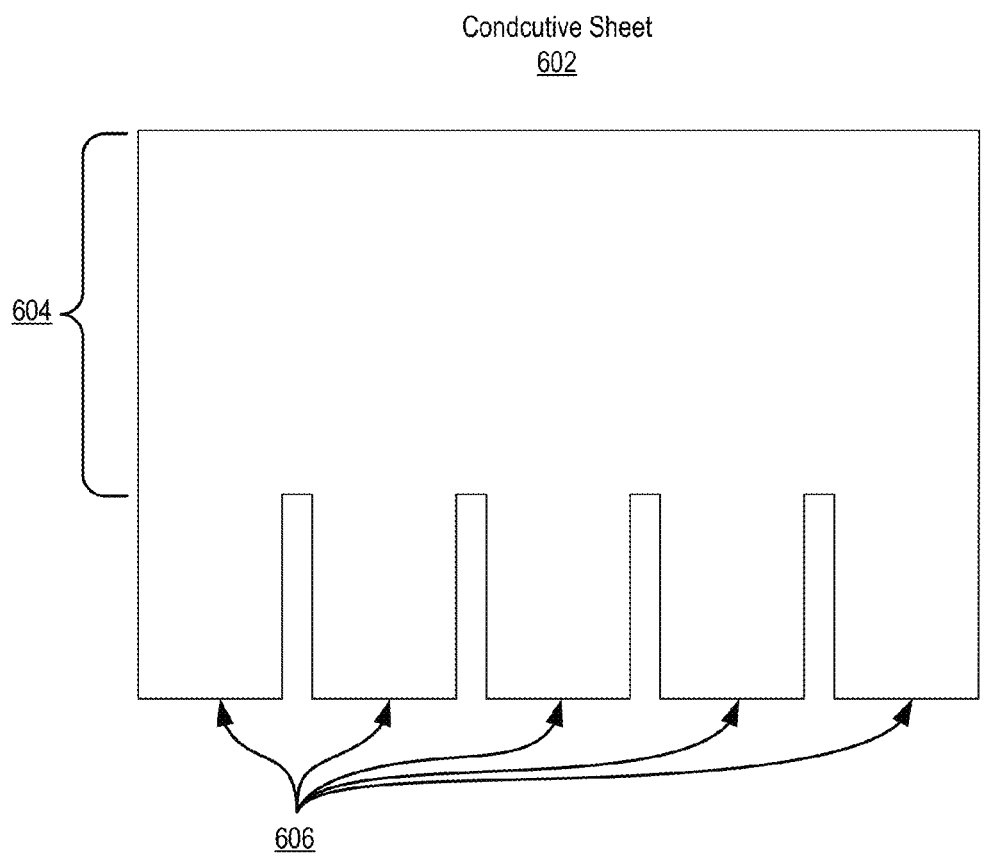
FIG. 6 sets forth a birds eye diagram of an example conductive sheet of a coupled inductor for use in a DC-DC converter operated in accordance with embodiments of the present invention.

For further explanation, FIG. 6 sets forth a birds eye diagram of an example conductive sheet of a coupled inductor for use in a DC-DC converter operated in accordance with embodiments of the present invention. The example conductive sheet (602) of FIG. 6 may be formed of a variety of materials such as, for example, aluminum sheet metal.

In the example of FIG. 6 the conductive sheet is a comb structure having a tab (604) and a plurality of parallel teeth (606). The tab forms the upper portion of the conductive sheet (602) in the example of FIG. 6 and the teeth form the lower portion of the conductive sheet as depicted in the example of FIG. 6.

Each of the plurality of parallel teeth (606) extends from the tab (604). The teeth may be formed through etching or other machining of the conductive sheet such that adjacent teeth have a predefined amount of space between them. The conductive sheet in the example of FIG. 6 may be configured for insertion into a slot formed by the magnetic core according to embodiments of the present invention.

Figure 7:
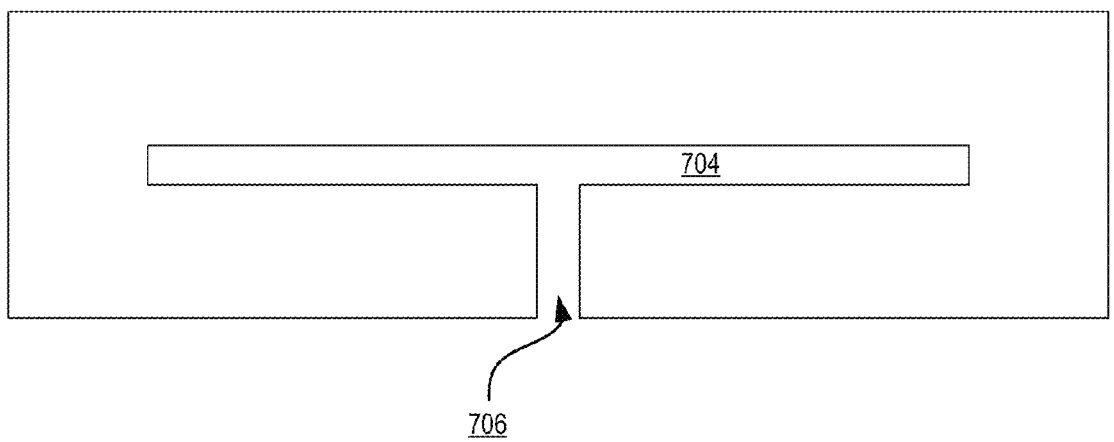
FIG. 7 sets forth a line cross sectional diagram of an example magnetic core for use in DC-DC converters operated in accordance with embodiments of the present invention.

To that end, FIG. 7 sets forth a line cross sectional diagram of an example magnetic core (702) for use in DC-DC converters operated in accordance with embodiments of the present invention. A magnetic core is a piece of magnetic material with a high permeability used to confine and guide magnetic fields in electrical, electromechanical, and magnetic devices such as electromagnets, transformers, electric motors, generators, inductors, magnetic recording heads, and magnetic assemblies. Such a magnetic core may be made of a ferromagnetic metal such as iron, or ferromagnetic compounds such as ferrites. The high permeability, relative to the surrounding area, causes the magnetic field lines to be concentrated in the core material. The use of a magnetic core may enormously concentrate the strength and increase the effect of magnetic fields produced by electric currents and permanent magnets. The properties of such a device may depend on the following factors:

- the geometry of the magnetic core;
- the amount of air gap in the magnetic circuit;
- the properties of the core material (especially permeability and hysteresis)1
- the operating temperature of the core' and
- whether the core is laminated to reduce eddy currents.

The magnetic core (702) in the example of FIG. 7 has a front, back and bottom side. The view depicted in the example of FIG. 7 may represent either the front or back side. The bottom side of the example magnetic core of FIG. 7 includes an air gap (706). The open loop response of the magnetic core (702) of FIG. 7 is determined by the width of the air gap.

The example magnetic core (702) of FIG. 7 is formed to define a slot (702) extending through the magnetic core from the front to the back side. The slot is configured to accept insertion of a conductive sheet formed of a comb structure with a tab and a plurality of parallel teeth extending from the tab similar to the example conductive sheet of FIG. 6.

Figure 8:
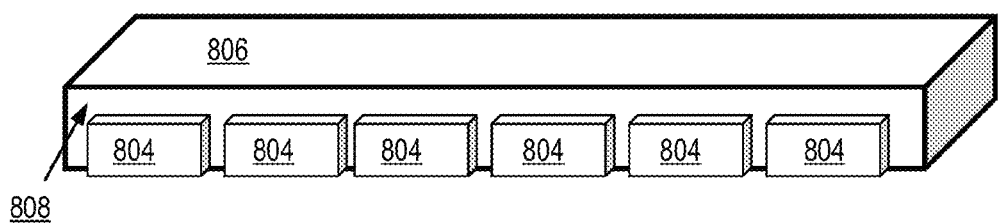
FIG. 8 depicts a perspective view of the front side of an example coupled inductor for use in DC-DC converters operated in accordance with embodiments of the present invention.
Figure 9:
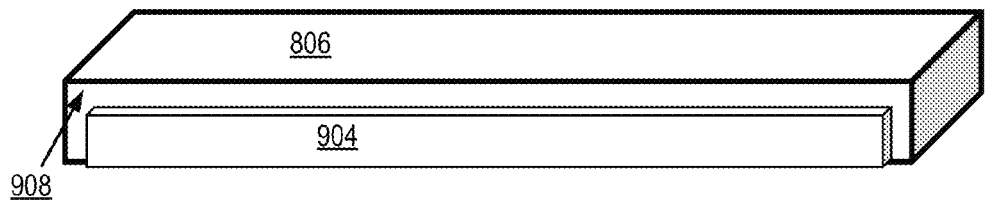
FIG. 9 depicts a perspective view of the back of the example coupled inductor of FIG. 8.
Figure 10:
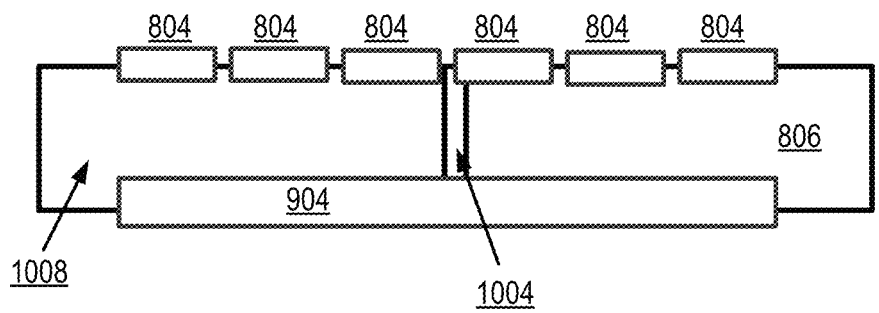
FIG. 10 depicts a perspective view of the bottom of the example coupled inductor of FIG. 8.

For further explanation, FIG. 8 depicts a perspective view of the front side of an example coupled inductor for use in DC-DC converters operated in accordance with embodiments of the present invention, FIG. 9 depicts a perspective view of the back of the example coupled inductor, and FIG. 10 depicts a perspective view of the bottom of the example coupled inductor. The coupled inductor (802) in the example of FIGS. 8-10 includes a magnetic core (806) similar to the magnetic core in the example of FIG. 7. The magnetic core of the example of FIGS. 8-10 includes a front (808) side, back side (908), and a bottom side (1008). The bottom side (1008) includes an air gap (1004). The magnetic core (806) of FIGS. 8-10 is formed to define a slot (view blocked by conductive sheet described below) extending through the magnetic core (806) from the front (808) to the back side (908).

The example coupled inductor (802) of FIGS. 8-10 also includes a conductive sheet that includes a comb structure having a tab (904) and a plurality of parallel teeth (804) extending from the tab. In the example of FIGS. 8-10, the conductive sheet has been inserted into and through the slot defined by the forming of the magnetic core (806) such that the conductive sheet extends through the magnetic core from the back (908) to the front side (808) of the magnetic core (806). A portion of the tab (904) protrudes from the back side (908) and a portion of each of the plurality of teeth (804) protrudes from the front side (808) of the magnetic core. Each of the teeth is configured to be coupled to a connection node of a power-switching phase.

The tab (904) includes an end portion that, as seen in FIG. 10 may be bent around the back side (908) of the magnetic core (806) and under a portion of the bottom side (904) of the magnetic core. In a similar manner, each of the plurality of teeth (804) may include an end portion that is bent around the front side (808) and under a portion of the bottom side (1008) of the magnetic core. The end portions of the teeth (804) and the tab (904), once bent under the bottom side (1008) of the magnetic core (806) provide an efficient means of soldering the coupled inductor to a printed circuit board or other structure.

For further explanation, FIG. 11 sets forth a flow chart illustrating an exemplary method for operating a DC-DC converter according to embodiments of the present invention. In the method of FIG. 11, the DC-DC converter may be similar to the DC-DC converters described above, including a plurality a power-switching phases, with each phase including a high-side switch and a low-side switch. The high-side switch may be electrically coupled to the low-side switch at a connection node of the power-switching phase. The high-side switch of each power-switching phase may be configured, when activated, to couple a voltage source to the phase's single loop coil. Each low-side switch of each phase is configured, when activated, to couple the phase's single loop coil to a ground voltage.

The DC-DC converter may also include a coupled inductor that includes a magnetic core having a front, back, and bottom side. The bottom side may include an air gap. The magnetic core may also be formed to define a slot extending through the magnetic core from the front to the back side.

The DC-DC converter may also include a conductive sheet formed of a comb structure having a tab and a plurality of parallel teeth extending from the tab. The conductive sheet may be inserted into the slot such that the conductive sheet extends through the magnetic core from the back to the front side, a portion of the tab protruding from the back side and a portion of each of the plurality of teeth protruding from the front side. Each of the teeth may be configured to be coupled to a connection node of a power-switching phase. The tab extending through the magnetic core forms, for each power-switching phase, a toroidal inductor with a single loop coil, and forms, for the plurality of power-switching phases, a directly coupled inductor. The tab may also be electrically coupled to a filter and a load.

With such a DC-DC converter, the method of FIG. 11 includes alternatively activating (1102) each switch, where no two switches of any phase are activated at the same time. In the method of FIG. 11 alternatively activating (1102) each switch is carried out by activating (1104) the high-side switch of a first power-switching phase, including coupling the voltage source to the phase's single loop coil, energizing the magnetic material around the single loop coil, and providing, via the single loop coil, output current to the filter and load; activating (1104) the low-side switch of the first power-switching phase, including coupling the phase's single loop coil to the ground voltage and providing, via a second power-switching phase's single loop coil and the energized magnetic material, output current to the filter and load; activating (1106) the high-side switch of the second power-switching phase, including coupling the voltage source to the second power-switching phase's single loop coil, re-energizing the magnetic material around the first power-switching phase's single coil element, and providing, via the second power-switching phase's single coil element, output current to the filter and load; and activating (1108) the low-side switch of the second power-switching phase, including coupling the second power-switching phase's single loop coil to the ground voltage and providing, via the first power-switching phase's single loop coil and the energized magnetic material, output current to the filter and load.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating a DC ('Direct Current')-DC converter, the DC-DC converter comprising:
   a plurality a power-switching phases, each phase including a high-side switch and a low-side switch, the high-side switch electrically coupled to the low-side switch at a connection node of the power-switching phase, the high-side switch of each power-switching phase is configured, when activated, to couple a voltage source to the phase's single loop coil, the low-side switch of each phase is configured, when activated, to couple the phase's single loop coil to a ground voltage;
   a coupled inductor comprising:
   a magnetic core having a front, back, and bottom side, the bottom side including an air gap, the magnetic core formed to define a slot extending through the magnetic core from the front to the back side; and
   a conductive sheet comprising a comb structure having a tab and a plurality of parallel teeth extending from the tab, the conductive sheet inserted into the slot such that the conductive sheet extends through the magnetic core from the back to the front side, a portion of the tab protruding from the back side and a portion of each of the plurality of teeth protruding from the front side, wherein:

each of the teeth is configured to be coupled to a connection node of a power-switching phase;

the tab extending through the magnetic core forms, for each power-switching phase, a toroidal inductor with a single loop coil, and forms, for the plurality of power-switching phases, a directly coupled inductor;

the tab is electrically coupled to a filter and a load; and the method comprises alternatively activating each switch, wherein no two switches of any phase are activated at the same time.

2. The method of claim 1 wherein:

the tab further comprises an end portion bent around the back side of the magnetic core and under a portion of the bottom side of the magnetic core and each of the plurality of teeth comprises an end portion bent around the front side and under a portion of the bottom side of the magnetic core.

3. The method of claim 1 wherein alternatively activating each switch further comprises:

activating the high-side switch of a first power-switching phase, including coupling the voltage source to the phase's single loop coil, energizing the magnetic core around the single loop coil, and providing, via the single loop coil, output current to the filter and load;

activating the low-side switch of the first power-switching phase, including coupling the phase's single loop coil to the ground voltage and providing, via a second power-switching phase's single loop coil and the energized magnetic core, output current to the filter and load;

activating the high-side switch of the second power-switching phase, including coupling the voltage source to the second power-switching phase's single loop coil, re-energizing the magnetic core around the first power-switching phase's single coil element, and providing, via the second power-switching phase's single coil element, output current to the filter and load; and activating the low-side switch of the second power-switching phase, including coupling the second power-switching phase's single loop coil to the ground voltage and providing, via the first power-switching phase's single loop coil and the energized magnetic core, output current to the filter and load.

4. The method of claim 1 wherein alternatively activating each switch further comprises:

activating each high side switch for a period of time according to:

$$\frac{D}{N}$$

where D represents a duty cycle and N represents the number of power-switching phases; and activating each low-side switch for a period of time according to:

$$\frac{(1-D)}{N}.$$

5. The method of claim 1 wherein the number of power-switching phases is inversely proportional to the duty cycle of activating the switches and thereby inversely proportional to the inductance of the directly coupled inductor.

6. The method of claim 1 wherein current ripple experienced by the filter and the load comprises:

$$\frac{1}{f*L_{OL}}*\left(1-\frac{V_{OUT}}{V_{IN}}\right)*\frac{V_{OUT}}{N},$$

where f represents the frequency of alternatively activating each switch, $L_{OL}$ represents the open loop inductance of directly coupled inductor, N represents the number of power-switching phases, $V_{IN}$ represents the voltage of the voltage source and $V_{OUT}$ represents the voltage experienced at the filter and load.

7. The method of claim 1 wherein each high-side switch and each low-side switch comprises a Field Effect Transistor implemented in silicon.

8. A coupled inductor comprising:

a magnetic core having a front, back, and bottom side, the bottom side including an air gap, the magnetic core formed to define a slot extending through the magnetic core from the front to the back side; and a conductive sheet comprising a comb structure, the comb structure comprising a tab and a plurality of parallel teeth extending from the tab, the conductive sheet inserted into the slot such that the conductive sheet extends through the magnetic core from the back to the front side, a portion of the tab protruding from the back side and a portion of each of the plurality of teeth protruding from the front side, wherein:

each of the teeth is configured to be coupled to a connection node of a power-switching phase that includes a high-side switch and a low-side switch, the high-side switch electrically coupled to the low-side switch at the connection node of the power-switching phase;

the tab extending through the magnetic core forms, for each power-switching phase, a toroidal inductor with a single loop coil, and forms, for the plurality of power-switching phases, a directly coupled inductor;

the tab is configured to be electrically coupled to a filter and a load;

the high-side switch of each power-switching phase is configured, when activated, to couple a voltage source to the phase's single loop coil;

the low-side switch of each phase is configured, when activated, to couple the phase's single loop coil to a ground voltage; and each switch is configured to be alternatively activated and no two switches of any phase are activated at the same time.

9. The coupled inductor of claim 8 wherein:

the tab further comprises an end portion bent around the back side of the magnetic core and under a portion of the bottom side of the magnetic core and each of the plurality of teeth comprises an end portion bent around the front side and under a portion of the bottom side of the magnetic core.

10. The coupled inductor of claim 8 wherein each switch is configured to be alternatively activated and no two switches of any phase are activated at the same time by:

activating the high-side switch of a first power-switching phase, including coupling the voltage source to the phase's single loop coil, energizing the magnetic core around the single loop coil, and providing, via the single loop coil, output current to the filter and load;

activating the low-side switch of the first power-switching phase, including coupling the phase's single loop coil to the ground voltage and providing, via a second power-switching phase's single loop coil and the energized magnetic core, output current to the filter and load;

activating the high-side switch of the second power-switching phase, including coupling the voltage source to the second power-switching phase's single loop coil, re-energizing the magnetic core around the first power-switching phase's single coil element, and providing, via the second power-switching phase's single coil element, output current to the filter and load; and activating the low-side switch of the second power-switching phase, including coupling the second power-switching phase's single loop coil to the ground voltage and providing, via the first power-switching phase's single loop coil and the energized magnetic core, output current to the filter and load.

11. The coupled inductor of claim 8 wherein each switch is configured to be alternatively activated by:

activating each high side switch for a period of time according to:

$$\frac{D}{N}$$

where D represents a duty cycle and N represents the number of power-switching phases; and activating each low-side switch for a period of time according to:

$$\frac{(1-D)}{N}.$$

12. The coupled inductor of claim 8 wherein the number of power-switching phases is inversely proportional to the duty cycle of activating the switches and thereby inversely proportional to the inductance of the directly coupled inductor.

13. The coupled inductor of claim 8 wherein current ripple experienced by the filter and the load comprises:

$$\frac{1}{f*L_{OL}} * \left(1 - \frac{V_{OUT}}{V_{IN}}\right) * \frac{V_{OUT}}{N},$$

where f represents the frequency of alternatively activating each switch, $L_{OL}$ represents the open loop inductance of directly coupled inductor, N represents the number of power-switching phases, $V_{IN}$ represents the voltage of the voltage source and $V_{OUT}$ represents the voltage experienced at the filter and load.

14. The coupled inductor of claim 8 wherein each high-side switch and each low-side switch comprises a Field Effect Transistor implemented in silicon.

15. A DC ('Direct Current')-DC converter comprising:

a plurality a power-switching phases, each phase including a high-side switch and a low-side switch, the high-side switch electrically coupled to the low-side switch at a connection node of the power-switching phase, the high-side switch of each power-switching phase is configured, when activated, to couple a voltage source to the phase's single loop coil, the low-side switch of each phase is configured, when activated, to couple the phase's single loop coil to a ground voltage; and a coupled inductor comprising:

a magnetic core having a front, back, and bottom side, the bottom side including an air gap, the magnetic core formed to define a slot extending through the magnetic core from the front to the back side; and a conductive sheet comprises a comb structure having a tab and a plurality of parallel teeth extending from the tab, the conductive sheet inserted into the slot such that the conductive sheet extends through the magnetic core from the back to the front side, a portion of the tab protruding from the back side and a portion of each of the plurality of teeth protruding from the front side, wherein:

each of the teeth is configured to be coupled to a connection node of a power-switching phase;

the tab extending through the magnetic core forms, for each power-switching phase, a toroidal inductor with a single loop coil, and forms, for the plurality of power-switching phases, a directly coupled inductor;

the tab is electrically coupled to a filter and a load; and each switch is alternatively activated and no two switches of any phase are activated at the same time.

16. The DC-DC converter of claim 15 wherein:

the tab further comprises an end portion bent around the back side of the magnetic core and under a portion of the bottom side of the magnetic core and each of the plurality of teeth comprises an end portion bent around the front side and under a portion of the bottom side of the magnetic core.

17. The DC-DC converter of claim 15 wherein each switch is configured to be alternatively activated and no two switches of any phase are activated at the same time by:

activating the high-side switch of a first power-switching phase, including coupling the voltage source to the phase's single loop coil, energizing the magnetic core around the single loop coil, and providing, via the single loop coil, output current to the filter and load;

activating the low-side switch of the first power-switching phase, including coupling the phase's single loop coil to the ground voltage and providing, via a second power-switching phase's single loop coil and the energized magnetic core, output current to the filter and load;

activating the high-side switch of the second power-switching phase, including coupling the voltage source to the second power-switching phase's single loop coil, re-energizing the magnetic core around the first power-switching phase's single coil element, and providing, via the second power-switching phase's single coil element, output current to the filter and load; and activating the low-side switch of the second power-switching phase, including coupling the second power-switching phase's single loop coil to the ground voltage and providing, via the first power-switching phase's single loop coil and the energized magnetic core, output current to the filter and load.

18. The DC-DC converter of claim 15 wherein each switch is configured to be alternatively activated by:

activating each high side switch for a period of time according to:

$$\frac{D}{N}$$

where D represents a duty cycle and N represents the number of power-switching phases; and activating each low-side switch for a period of time according to:

$$\frac{(1-D)}{N}.$$

19. The DC-DC converter of claim 15 wherein the number of power-switching phases is inversely proportional to the duty cycle of activating the switches and thereby inversely proportional to the inductance of the directly coupled inductor.

20. The DC-DC converter of claim 15 wherein current ripple experienced by the filter and the load comprises:

$$\frac{1}{f*L_{OL}}*\left(1-\frac{V_{OUT}}{V_{IN}}\right)*\frac{V_{OUT}}{N},$$

where f represents the frequency of alternatively activating each switch, $L_{OL}$ represents the open loop inductance of directly coupled inductor, N represents the number of power-switching phases, $V_{IN}$ represents the voltage of the voltage source and $V_{OUT}$ represents the voltage experienced at the filter and load.

* * * * *